Dec. 31, 1946.  J. W. RUSH ET AL  2,413,380
FLUID PRESSURE MOTOR
Filed Aug. 31, 1944

INVENTORS
John W. Rush
Arthur J. Bent
BY
ATTORNEY

Patented Dec. 31, 1946

2,413,380

UNITED STATES PATENT OFFICE 2,413,380

FLUID PRESSURE MOTOR

John W. Rush and Arthur J. Bent, Wilkinsburg, Pa., assignors to The Westinghouse Air Brake Company, Wilmerding, Pa., a corporation of Pennsylvania Application August 31, 1944, Serial No. 552,110

7 Claims. (Cl. 121—41)

This invention relates to control devices and more particularly to the type adapted to be controlled and operated by fluid under pressure.

In the copending application of Rankin J. Bush, Serial No. 480,161, filed March 23, 1943, and assigned to the assignee of the present application, there is disclosed a fluid pressure control system for controlling a plurality of internal combustion engines, such as employed for propelling an airplane, said system comprising for each engine a plurality of fluid motors, one for controlling the engine speed, another for controlling the richness of the fuel mixture supplied to the engine, still another for controlling the temperature of the mixture, and a fourth for controlling operation of a blower or supercharger for the engine.

One object of the invention is the provision of an improved fluid motor for controlling devices of the above general type. Another object of the invention is the provision of a fluid motor for controlling operation of a device such as above mentioned and which embodies means automatically operative in case of failure of the supply of fluid under pressure for controlling operation of the motor, for moving said device to and for holding it in a chosen position.

Another object of the invention is the provision of a fluid motor embodying fluid operated power piston means and an operator's fluid pressure controlled pilot means which is constructed to be very sensitive to changes in controlling pressure and therefore accurately adjustable in accordance with fine increments of such change, so as to render the power means accurately and positively adjustable in accordance with changes in the pressure of controlling fluid on the pilot means.

Another object of the invention is the provision of a fluid motor embodying power piston means which is so constructed and controlled as to move to and positively stop in any position selected by operation of the pilot portion of the motor, that is to say, the power piston means will not overtravel the selected position nor will it oscillate to either one side or the other of such position.

Another object of the invention is the provision of a motor of the above type which is relatively small in size, compact and simple in construction, and light in weight for the purpose intended.

Other objects and advantages will be apparent from the following more detailed description of the invention.

Figure 1:
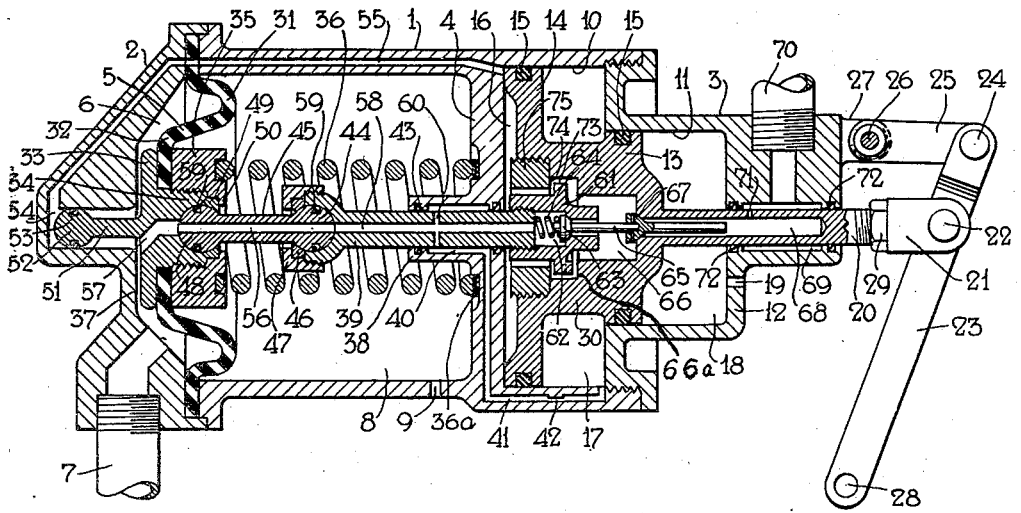
Figure 2:
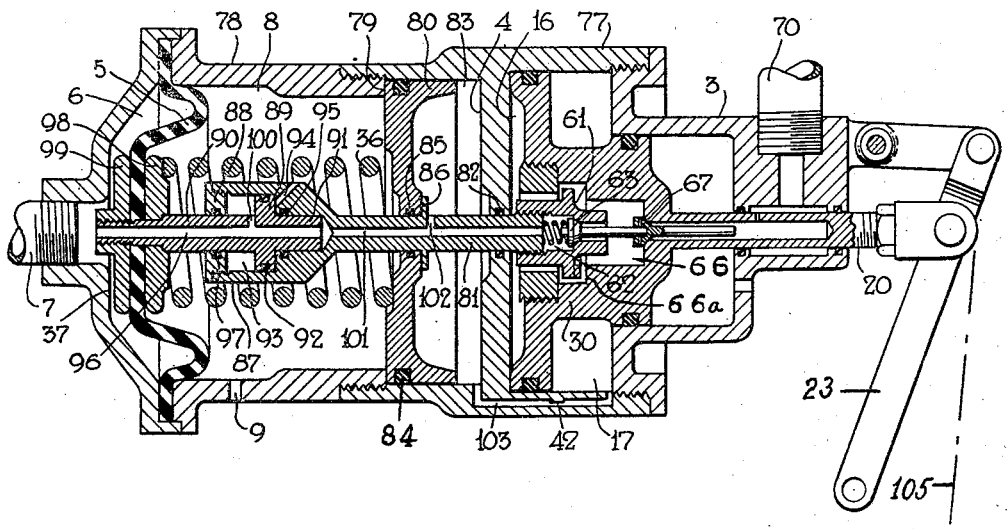

In the accompanying drawing: Fig. 1 is a longitudinal sectional view, partly in diagrammatic form, of one embodiment of the invention; and Fig. 2 is a view similar to Fig. 1 of a modified form of the invention.

Description—Fig. 1

The fluid motor shown in Fig. 1 of the drawing comprises a cylindrical casing 1 one end of which is closed by a cover 2, while the opposite end is closed by a cover 3, and intermediate the ends of the casing there is provided an internal wall 4. A flexible diaphragm 5 is clamped around its peripheral edge between the casing 1 and cover 2 and has at one side a chamber 6 open to a combined control and fluid pressure supply pipe 7. At the opposite side of diaphragm 5 is a chamber 8 formed between the diaphragm and casing wall 4. The chamber 8 is in constant communication with atmosphere through a passage 9.

At the opposite side of wall 4 the casing 1 has a piston bore 10. The cover 3 has a piston bore 11 spaced axially from and arranged in concentric relation to the bore 10. One end of bore 11 is open to the bore 10 while the opposite end is closed by a wall 12 constituting a portion of the cover 3. The bore 11 is of smaller diameter than bore 10 and slidably mounted in those bores are pistons 13 and 14, respectively, each having a ring groove in which is mounted a packing ring 15 having sealing sliding contact with the wall of the respective bore. The two piston heads 13 and 14 are axially aligned and connected for movement in unison and constitute a differential area power piston means 30. Between the piston head 14 and wall 4 there is provided a fluid pressure control chamber 16. Between the two pressure heads 13 and 14 is a dash-pot chamber 17. Between the piston head 13 and the end wall 12 of cover 3 is a chamber 18 which is in constant communication with atmosphere through a passage 19.

The wall 12 of cover 3 is provided with a bore axially aligned with the piston heads 13 and 14, and projecting through this bore from the piston head 13 is a piston rod 20. Outside of cover 3 the piston rod 20 is adjustably connected by screw threads to one end of a link 21, a lock nut 29 on said rod being provided for engagement with said link to hold it in an adjusted position. The opposite end of link 21 is operatively connected by a pin 22 to an operating lever 23 at a point between the ends of the lever. One end of lever 23 is connected by the pin 24 to one end of a fulcrum link 25. The opposite end of link 25 is fulcrumed on a pin 26 which is carried by an ear 27 projecting from the cover 3. In the opposite end of lever 23 is an opening 28 which is provided to receive a pin or the like for connecting said lever to a device which it is desired to operate by the motor. The lever 23 has a normal position in which it is shown in the drawing and is movable out of this position by the power piston means 30, as will be later described.

The flexible diaphragm 5 is of the type comprising an annular corrugation 31, an outer flange encircling said corrugation for clamping between the casing section 1 and cover 2, and an inner perforated flange 32. A diaphragm follower 33 contained in control chamber 6 has a stud portion 34 extending through the central opening in diaphragm 5, while a follower 35 contained in chamber 8 is secured to this stud portion by screw threaded engagement for clamping the central flange 32 of the diaphragm between the two followers. A coil type regulating spring 36 arranged in coaxial relation with the diaphragm 5 and power piston means 30 is contained in chamber 8 and is supported at one end on the casing wall 4 while its opposite end bears against the diaphragm follower 35. This spring is under pressure and therefore effective to deflect the diaphragm and move the followers 33 and 35 against pressure of fluid in chamber 6 and in the direction of a stop 37 provided in cover 2. Shims 36a may be employed between wall 4 and the adjacent end of the spring 36 for adjusting its pressure against diaphragm 5.

The casing wall 4 is provided with a boss 38 which extends into chamber 8 within the regulating spring 36. Extending through the boss 38 and slidably mounted therein in coaxial relation with the piston means 30 and diaphragm 5 is an operating rod 39. One end of the rod 39 projects into chamber 16 at one side of the power piston means 30, while the opposite end is disposed in chamber 8. The boss 38 is provided with an annular chamber 40 encircling the rod 39 and connected by a passage 41 to chamber 17 formed between the two piston heads 13 and 14. A choke or restriction 42 is provided in the passage 41 for limiting the rate of flow of fluid under pressure to chamber 17 and out of said chamber, as will be later described. At opposite ends of the chamber 40 the boss 38 and wall 4 are provided with grooves containing rings 43 having sealing and sliding contact with rod 39 for preventing leakage of fluid under pressure from said chamber.

In the end of that portion of the rod 39 which is disposed in chamber 8 there is provided a semispherical socket in which is disposed a ball-like end 44 of a link 45, said end 44 being secured in said socket by a member 46 secured to the end of rod 39 by a nut 47. The link 45 has at its opposite end a ball-like structure 48 which is seated in a socket in the end of the diaphragm follower stud 34, and which is secured to said stud by a member 49 urged into contact with the ball-like end by a flange 50 projecting from the diaphragm follower 35. Projecting from the diaphragm follower 33 into a bore in cover 2 is a member 51 having at its end a ball-like structure 52 of larger diameter than said member and in substantial contact with the wall of said bore. The ball and socket connections between the opposite ends of link 45 and the operating rod 39 and diaphragm follower 33, and between the cover 2 and ball-like end 52 at the end of member 51 are provided to allow the diaphragm 5 to freely rock or tilt relative to member 39 in a direction or directions which will rock the axis of the diaphragm, in order that the diaphragm may freely adjust itself to the regulating spring 36 without causing binding of the operating rod 39 within the boss 38. This structure is adapted to render the diaphragm very sensitive to slight changes in pressure in control chamber 6, and therefore accurately adjustable in accordance with such changes in pressure.

A sealing ring 53 is disposed in a groove provided in the ball-like structure 52 and has sealing and sliding contact with the wall of the bore in which said structure operates, in order to prevent leakage of fluid under pressure between chamber 6 at one side of the structure and chamber 54 at the opposite side. Chamber 54 is in constant communication with the power chamber 16 through a passage 55. The link 45 is provided with an axial passage 56 open at one end to a passage 57 in the diaphragm follower 33 and open at the opposite end to a passage 58 in the operating rod 39. Ring like seal members 59 are provided in the ball-like ends of link 45 and have sealing and sliding contact with the walls of the respective sockets for preventing leakage of fluid under pressure from these passages to chamber 8.

Passage 57 in the diaphragm follower 33 is open to control chamber 6, so that fluid under pressure effective in said chamber may flow through said passage and passage 56 to passage 58 in the operating rod 39. Within boss 38 the operating rod 39 is provided with one or more radial bores 60 connecting passage 58 to the annular chamber 40, whereby the control chamber 6 and dash-pot chamber 17 between the piston heads 13 and 14 of the power piston means 30 are in constant communication.

In the power chamber 16 the operating rod 39 is connected to and supports a valve control member 61 which has a chamber 62 containing a fluid pressure supply valve 63 and a spring 64 acting on said valve for urging it to a closed or seated position in which it is shown in the drawing. The passage 58 in operating rod 39 is open to chamber 62 whereby said chamber is adapted to be constantly supplied with fluid under pressure from the control chamber 6.

The supply valve 63 is arranged in coaxial relation with the power piston means 30 and has a stem 65 projecting through a bore in the valve control member 61 into a chamber 66 in the power piston means 30. The chamber 66 is open at all times past the valve member 61 to the power chamber 16 and contains a fluid pressure release valve 67 arranged in coaxial relation with the supply valve stem 65 and to which said release valve is secured, whereby the two valves are movable in unison.

The release valve 67 is adapted to cooperate with a seat provided on the power piston means 30 around one end of a passage 68 extending into the piston rod 20 for thereby controlling communication between said passage and the power chamber 16. In cover 3 an annular chamber 69 is provided around the piston rod 20 and is connected to a fluid pressure release pipe 70. The piston rod 20 is provided with a radial port 71 connecting passage 68 in the rod to the annular chamber 69. Beyond each of the opposite ends of chamber 69 the cover 3 carries a ring seal member 72 having sealing and sliding contact with said rod to prevent leakage of fluid under pressure from chamber 69 to atmosphere.

The radial release port 71 is of relatively small area constituting in effect a choke for limiting the rate of release of fluid under pressure from chambers 66 and 16 to a degree having a certain relation to the flow capacity of choke 42. Likewise, there is a certain relation between choke 42 and the rate at which fluid may be supplied past the supply valve 63 to chambers 66 and 16 and this relation may be obtained by the supply valve stem 65 reducing the area of the opening through the valve control member 61 in which said stem is disposed, to a degree which provides the required choking effect to obtain said relation. The size of these openings as shown in the drawing are merely illustrative.

The release pipe 70 may lead directly to atmosphere or it may lead to a so-called sump reservoir provided for receiving fluid under pressure after it has been used for effecting a desired operation. The pressure of fluid in the sump reservoir may at times exceed that of the atmosphere, hence the use of the sealing rings 72. Whether the pipe 70 leads to the atmosphere or to a sump reservoir is however immaterial to the present invention. A sump reservoir of the type under consideration is however shown and fully described in the copending application hereinbefore referred to and, if desired, reference may be made to that application for a more complete description thereof.

The valve control member 61 is provided with an annular collar or flange 73 for engaging the inner surface 74 of a member 75 provided in the power piston means 30, whereby movement of the valve control member 61 by the operating rod 39 in the direction of the casing cover 2 will pull the power piston means 30 to the position in which it is shown in the drawing. At the opposite side of flange 73 on valve member 61 there is clearance space provided to allow movement of said valve control member relative to the power piston means 30 a distance sufficient to open the supply valve 63 without said member contacting a shoulder or surface 66d in chamber 6.

It will be noted that the operating rod 39, valve control member 61, and the supply and release valves 63 and 67, respectively, are supported by the casing wall 4, independently of the pilot means including diaphragm 5 and followers 33 and 35, and also independently of the power piston means 30, whereby said rod, member and valves will at all times be maintained in operative relation to the diaphragm 5 and will prevent binding of said rod within the boss 38 in case of tilting of said diaphragm relative to said member or, if for any reason the power piston means 30 should tend to bind in the bores in which it is disposed.

*Operation—Fig. 1*

It is intended that the control pipe 7 and thereby the control chamber 6 be normally recharged with fluid at a pressure in excess of atmospheric pressure, such as eighty pounds, and that the operation of the motor to adjust lever 23 will be obtained by varying the pressure through a range, such as seventy pounds, above the eighty pounds.

Now let it be assumed that pipe 7 and the control chamber 6 are charged with fluid at the normal pressure of eighty pounds. This pressure, effective on diaphragm 5, will move said diaphragm, the followers 35 and 33, the link 45, the operating member 39 and valve control member 61 against the opposing pressure of the regulating spring 36 to a position in which the pressure of said spring will have increased to a degree to counterbalance the pressure of fluid in chamber 6, whereupon such movement will cease. This position may be adjusted toward or away from the stop shoulder 37 in cover 2 by the use of shims 36a, as will be apparent.

Fluid at the normal pressure of eighty pounds in pipe 7 and chamber 6 will equalize through passage 57 in the diaphragm follower 33, passage 56 in link 45, passage 58 and ports 60 in the operating rod 39, chamber 40 and passage 41 into the dash-pot chamber 17 between the two piston heads 13 and 14. The pressure of fluid thus obtained between the two piston heads 13 and 14 will create a force, equal to said pressure times the difference in areas of the two piston heads, which will act to urge the power piston means 30 in the direction of the diaphragm 5. The position which the diaphragm 5 assumes when subject in chamber 6 to the normal pressure of eighty pounds is preferably so adjusted by the shims 36a, that the power piston means 30 moving under the pressure of fluid in the dash-pot chamber 17, will contact the casing wall 4 at the same time it moves into seating engagement with the release valve 67 and hence without opening the supply valve 63. In the drawing the parts of the motor are shown in the positions just described, which will be assumed to be their normal positions, and with the power piston means 30 thus positioned, the lever 23 will also assume a normal position in which it is shown in the drawing.

If the operator now desires to rock the control lever 23 out of its normal position in a counterclockwise direction, as viewed in the drawing, he will increase the pressure of fluid in chamber 6 through pipe 7 to a degree above the normal pressure of eighty pounds. This increase in pressure on diaphragm 5 will deflect said diaphragm against the opposing force of the regulating spring 36 to a new position in which the pressure of said spring is increased to a degree sufficient to counterbalance the pressure of fluid in said chamber whereupon the diaphragm will cease moving. This deflection of diaphragm 5 will act through rod 39 to move the valve control member 61 relative to the power piston means 30, and with the release valve 67 closed holding the supply valve 63 against movement in this direction, the valve control member 61 will move out of seating engagement with said supply valve. Fluid under pressure will then flow from the supply valve chamber 62 to the power piston chamber 16, and when the pressure of fluid in chamber 16 is thus increased sufficiently with respect to the opposing pressure of fluid in chamber 17 it will move the power piston means 30 in the direction of the right-hand and rock the lever 23 in a counterclockwise direction out of its normal position.

After the diaphragm 5 ceases movement in response to the increase in pressure of fluid in chamber 6, the movement of the power piston means 30 by the pressure of fluid in chamber 16 will be relative to the valve control member 61. The supply valve 63 will move with piston means 30 relative to the valve control member 61 until said valve seats against said valve control member to cut-off further flow of fluid under pressure to power piston chamber 16. When the supply of fluid under pressure to chamber 16 is thus cut off the power piston means 30 and lever 23 will stop, in a position determined by the position of the diaphragm 5 and thus by the increase in pressure of fluid in pipe 7 and control chamber 6.

The pressure of fluid required in power chamber 16 to operate the power piston means 30 and lever 23 will depend upon the resistance to movement of the device being controlled, so that at one time a relatively small increase in pressure in chamber 16 may be adequate to effect such movement, while at another time or under a different condition a greater pressure will be required in said chamber. The pipe 7, being however charged with fluid at a pressure in excess of eighty pounds, constitutes a source of fluid at adequate pressure to insure operation of the power piston means 30 to actuate lever 23 as intended.

It is desired to point out that the position to which the power piston means 30 is moved corresponds to the position of the diaphragm 5, and thus the increase in pressure in pipe 7 over the normal pressure, and the structure provides for obtaining fluid in chamber 16 at a pressure sufficient to ensure such positioning of the power piston means.

If the operator now desires to cause rocking of the lever 23 to a greater degree from its normal position, he will increase the pressure in pipe 7 and diaphragm chamber 6 to a degree corresponding to the desired new position of lever 23, and the motor will again operate in the same manner as above described, to move said lever and then stop it in the new position, which position again corresponds, to the position of diaphragm 5.

It will now be apparent that the lever 23 can be moved out of its normal position shown, to any other desired position, by providing fluid at the proper pressure in control pipe 7 and diaphragm chamber 6. This movement may be made in steps, if desired, or in a single step, according to the degree of increase in pressure in pipe 7 and chamber 6. When a maximum pressure of fluid is provided in pipe 7 and chamber 6, deflecting the diaphragm 31 against the opposing force of the diaphragm regulating spring 36 to a maximum degree, the lever 23 will be moved to a maximum extent away from its normal position, as will also be apparent.

The movement of the power piston means 30 as above described is opposed at all times by pressure of fluid in the dash-pot chamber 17, which is in constant communication with the control pipe 7 through the choke 42. It will thus be seen that when the pressure of fluid in pipe 7 is increased, the pressure in chamber 17 will also increase to provide a greater force for opposing movement of the power piston means.

This pressure in chamber 17 may even momentarily increase to a greater degree than that in pipe 7 since movement of the piston head 14 by pressure of fluid in chamber 16 will reduce the volume of chamber 17 and choke 42 will restrict outflow of fluid under pressure from said chamber, the degree of such increase depending upon and varying in proportion to the rate of movement of the power piston means 30 by pressure of fluid in chamber 16. If the rate of movement of the power piston means is relatively slow there may be substantially no increase in pressure in chamber 17 incident to the restricting effect of choke 42, however, if the piston means 30 tends to jump or move rapidly upon supply of fluid to the power chamber 16, the pressure in chamber 17 will suddenly increase to such a degree as to effectively dampen and reduce the rate of movement of said piston means. This damping effect acting in conjunction with the limited or restricted rate of supply of fluid under pressure to the power piston chamber 16 by way of the supply valve will then cause the power piston means 30 to positively stop as soon as the supply valve 63 seats, and hence in a position corresponding to the position of diaphragm 5 and the pressure of fluid in the control pipe 7, as above described. As soon as the power piston means 30 ceases moving, the pressure in chamber 17 will equalize with that in the control pipe 7 by way of choke 42, as will be apparent.

If the operator now desires to rock the lever 23 back toward its normal position he will reduce the pressure of fluid in pipe 7 and diaphragm chamber 6. The regulating spring 36 will then act to move the diaphragm 5 to a position in which the pressure of said spring is counterbalanced by the reduced pressure of fluid in chamber 6, whereupon the diaphragm will cease moving. This movement of the diaphragm and thereby of the operating rod 39 and valve control member 61 will be relative to the power piston means 30, and with the supply valve 63 seated, said valve will draw the release valve 67 away from its seat. Fluid under pressure will then be released from the power piston chamber 16 past the release valve 67 to bore 68 in the piston rod 20 and thence to the release pipe 70.

When the pressure of fluid in the power piston chamber 16 is thus reduced sufficiently, the opposing pressure of fluid in chamber 17 will move the power piston means in the direction of the left-hand. After the diaphragm 5 ceases movement, this movement of the power piston means will be relative to the valve control member 61 and to the release valve 67 until the seat for the release valve moves into engagement therewith to prevent further release of fluid under pressure from chamber 16 in a position of the power piston means corresponding to the position of the diaphragm 5, and thus corresponding to the degree of reduction in pressure in the control pipe 7. The power piston means 30 will stop in this position for reasons which will be later described. This movement of the power piston means 30 will move the lever 23 back toward its normal position, but said lever will stop out of its normal position in a position determined by the reduction in pressure in chamber 7 and the position of diaphragm 5, as will be apparent.

In case the operator desires to return the lever 23 further in the direction of its normal position he will effect a further reduction in pressure of fluid in control pipe 7 and in diaphragm chamber 6 and the motor will again operate as above described to correspondingly change the position of lever 23, as will be apparent. Upon reducing the pressure of fluid in pipe 7 and chamber 6 to the normal degree of eighty pounds, the lever 23 will be returned to its normal position as will also be apparent.

It will thus be seen that the operator can cause the lever 23 to be returned toward its normal position and to be stopped in any selected position out of normal position by reducing the pressure of fluid in the control pipe 7 to the proper degree. Such return movement of lever 23 may be made in any desired number of steps or may be continuous according to the pressure change in pipe 7 as will be seen.

When the pressure of fluid in pipe 7 is reduced to effect return movement of lever 23, the pressure of fluid in chamber 17 will also tend to correspondingly reduce by flow through choke 42. However, as the power piston means moves toward its normal position it will increase the volume of chamber 17 and the choke means 42 is effective, in case the power piston means 30 tends to move too rapidly or to jump toward its normal position, to so restrict inflow of fluid pressure from control pipe 7 to said chamber, that the pressure in said chamber will reduce below that in the control pipe to a degree proportional to the rate of such movement. This reduction in pressure in chamber 17 will reduce the force on piston means 30 tending to return it to its normal position and this action plus the limited or controlled rate of release of fluid under pressure from chamber 16 by way of the relatively small release port 71 is effective to stop the power piston means 30 immediately upon obtaining a position corresponding to that of the diaphragm, and in which the release valve 67 seats.

It will now be seen that due to the use of choke 42, chamber 17 acts in effect like a dash-pot, and it has been determined that this structure effectively prevents the piston means 30 from over-traveling a position corresponding to the pressure of fluid in the control pipe 7, and hence the position of the control or pilot diaphragm 5. This is very important, for in case the power piston means 30 were moving in response to an increase in pressure in chamber 16 and over-traveled, the release valve 67 would be opened and reduce the pressure of fluid in chamber 16, as a result of which, the direction of movement of the piston means would tend to reverse and close the release valve and reopen the supply valve 63, due to which the piston means would tend to again move in the original direction, resulting in what is known as pumping. Such action might even occur on reducing the pressure of fluid in the pipe 7 as above described. It has, however, been found that the dash-pot structure using control pipe pressure in the dash-pot chamber 17 and choke 42, plus the restricting means for limiting the rates of supply and release of fluid under pressure to and from chamber 16 effectively prevents pumping and renders the power piston means 30 stable and accurate in adjustment. Moreover this structure permits the desired prompt change in position of lever 23 in response to a change in pressure in the control pipe 7.

In the above described operation it will be noted that pressure of fluid in the power chamber 16 acting on the operating rod 39 is opposed and offset by the same pressure of fluid acting in chamber 54 on the ball-like structure 52, so as to have no effect upon the controlling pressure in chamber 6 acting on diaphragm 5.

In case of failure of the supply of fluid pressure on an airplane, as to pipe 7, it is desirable that the different controlling devices on the engine automatically operate to insure continued operation of the engine at an adequate speed to maintain the airplane in the air. The motor above described and shown in Fig. 1 of the drawing may be employed for controlling the richness or temperature of the fuel mixture to the engine, and in case of loss of the supply of controlling fluid pressure to pipe 7, it is desirable that the controlling lever 23 be automatically moved back to its normal position, in which it is shown in the drawing, to provide a rich fuel mixture to the engine or a fuel at a temperature which will insure against freezing of moisture in the fuel supply line.

This automatic return of lever 23 to its normal position is obtained in case of loss of the supply of fluid pressure to the control pipe 7 and diaphragm chamber 6 by means of the regulating spring 36. It will be seen that if the pressure of fluid in chamber 6 is lost, the spring 36 acting through link 45 and rod 39 will move flange 73 on the valve control member 61 into engagement with surface 74 on member 75. This will open the release valve 67 to release any fluid under pressure in chamber 16 and will then pull the piston means 30 to its normal position in which it is shown in the drawing, at which time the follower 33 secured to diaphragm 5 will substantially contact the stop shoulder 37 in the cover. It will be noted that with the parts of the motor in their normal positions, as shown in Fig. 1, the clearance space between the diaphragm follower 33 and shoulder 37 equals substantially the space between the flange 73 on valve control member 61 and surface 74 on the member 75 secured to the power piston means 30, whereby the above described positioning of the power piston means 30 will be assured in case of loss of fluid pressure in the control pipe 7.

*Description—Fig. 2*

The structure shown in Fig. 2 is particularly adapted for controlling the throttle or speed of the engine above referred to and differs from the structure shown in Fig. 1 of the drawing, particularly, in embodying means for automatically moving the control lever 23 to a position intermediate its two extreme positions, in case of loss of the supply of controlling fluid, so as to thereby provide sufficient fuel to the engine, under such a condition, to ensure operation of the engine at a speed above idling and sufficient to maintain the airplane in flight.

The motor shown in Fig. 2 comprises a casing made up of two casing sections 77 and 78 which are secured together by screw-threads in a manner shown in the drawing. At the junction of the two sections, the casing section 78 has a shoulder 79 overlying one end of a piston bore provided in the section 77 between the section 78 and wall 4. In this piston bore is slidably mounted a piston 80. The adjacent end of the regulating spring 36 in this structure is supported by the piston 80, in contrast to being supported by the wall 4 in the structure shown in Fig. 1 of the drawing.

The casing section 77 has secured to the outer end thereof the cover 3 and carries the differential area piston means 30, the valve control member 61, the supply valve 63, release valve 67, etc. all of the details of which are identical to corresponding parts of the motor shown in Fig. 1.

An operating rod 81, replacing the rod 39 in the structure shown in Fig. 1, is mounted to slide in a bore through the wall 4 and at one end is secured to the valve control member 61 within the power piston chamber 16. Within the wall 4 is a ring 82 having sealing and sliding contact with the peripheral surface of the operating rod 81 for preventing leakage of fluid under pressure to the power piston chamber 16 from a chamber 83 located between the wall 4 and the adjacent side of piston 80. The opposite side of piston 80 is subject to pressure of fluid in chamber 8 which is open to the fluid pressure release passage 9.

The piston 80 is provided with an annular groove in which is disposed a ring 84 having sealing and sliding contact with the wall of the piston bore for preventing leakage of fluid from chamber 83 to chamber 8. The operating rod 81 extends through a bore in piston 80 into chamber 8, and within said bore said piston carries a sealing ring 85 having sealing and sliding contact with the peripheral surface of said rod for preventing leakage of fluid under pressure from chamber 83 to chamber 8. In chamber 83 the operating rod 81 is provided with an annular collar 86 for contacting piston 80.

The operating rod 81 is provided, in chamber 8, with an enlargement 87 having a counterbore, the open end of which is closed by a cover 88, and slidably mounted in this counterbore is a piston 89. The piston 89 has oppositely extending stems 90 and 91, the stem 90 extending through a bore in cover 88, while the stem 91 is mounted to slide in a bore in the operating rod 81. The piston 89 is provided with a ring 92 having a sealing and sliding contact with the wall of the counterbore for preventing leakage of fluid under pressure from a chamber 93 at one side of the piston to a chamber at the opposite side, which latter chamber is open to the fluid pressure release passage 9 by way of a passage 94 and chamber 8. A sealing ring 95 is provided around the stem 91 to prevent leakage of fluid under pressure from an axial bore 96, extending through the piston 89 and stems 90 and 91, to the side of said piston which is open to chamber 8 through passage 94, while a ring 97 is provided in cover 88 and has sealing and sliding contact with the piston stem 90 for preventing leakage of fluid pressure from chamber 93 to chamber 8.

The diaphragm 5 is clamped between the two followers 98 and 99 and the piston stem 90 extends through the follower 98 and diaphragm 5 and has screw threaded engagement with follower 99 for clamping the followers centrally to the diaphragm. The follower 98 is engaged by the adjacent end of the regulating spring 36. The axial passage 96 is open at one end to the control chamber 6, and is connected by a port 100 to chamber 93. The inner end of passage 96 registers with a passage 101 extending through the operating rod 81 to the supply valve chamber 62. The rod 81 is provided with a port 102 connecting the axial passage 101 to chamber 83. Chamber 83 is connected by a passage 103 to the dash-pot chamber 17, and in this passage is the choke 42.

*Operation—Fig. 2*

When fluid at the normal minimum pressure of eighty pounds, above mentioned, is provided in pipe 7 and diaphragm chamber 6, this fluid pressure will equalize through passage 96 and port 100 into chamber 93, and, at the same time, will also equalize through passage 101 and port 102 into chamber 83, and through passage 103 and choke 42 into the dash-pot chamber 17.

Fluid at this minimum pressure provided in chamber 83 will move the piston 80 into contact with shoulder 79 and thereby compress spring 36 to the same degree as provided by wall 4 in the motor shown in Fig. 1. The piston 80 will then remain in this condition during all normal operation of the motor, i. e., in response to variations in pressure in pipe 7.

The normal or minimum pressure of fluid in chamber 6 will deflect diaphragm 5 against the opposing force of spring 36 to the normal position in which it is shown in the drawing, and this same pressure effective in chamber 93 on piston 89 will hold said piston against the inner end of its cylinder in contact with the end of the operating rod 81 to provide, in effect, an unyielding and rigid connection between the diaphragm 5 and the operating rod 81. With the parts conditioned as just described, the supply valve 63 will be closed, the release valve 67 will be closed, and the power piston means 30 will be in substantial contact with wall 4, for the same reasons as hereinbefore described in connection with the motor shown in Fig. 1.

With the parts of the motor shown in Fig. 2 of the drawing conditioned as just described, said motor will operate in the same manner as the motor shown in Fig. 1 in response to variations in the pressure of fluid in the control pipe 7, above the normal minimum pressure of eighty pounds, to selectively position the lever 23 in any desired position out of and including the normal position in which it is shown in the drawing.

The dot and dash line 105 indicates an intermediate position of lever 23 which it will assume when the pressure of fluid in the control pipe 7 is at a certain degree such as 115 lbs. which is in excess of the normal minimum pressure. With this motor connected for controlling the speed of the engine, let it be assumed that this position of lever 23 indicated by the dot and dash line 105 will provide for operation of the engine at the chosen speed required for maintaining the airplane in flight, as for instance, half speed, and to which position it is desired that the lever automatically be moved in case of loss of fluid under pressure from pipe 7, in contrast to being moved to the normal position, as occurs with the motor shown in Fig. 1.

In case the pressure of fluid in the control pipe 5 and diaphragm chamber 6 is lost, due to a broken pipe or the like the pressure of fluid in piston chamber 83 and in the dash-pot chamber 17 will at the same time be released. Upon this release of fluid under pressure from diaphragm chamber 6, the spring 36 will deflect the diaphragm to a position in which the follower 99 substantially engages the stop shoulder 37. At the same time, the pressure of spring 36 will move piston 80 into contact with the casing wall 4. If at the time of loss of fluid pressure from pipe 7, the engine is operating at a speed in excess of the chosen speed above mentioned this movement of the diaphragm 5 and thereby of piston 89, will move said piston into contact with cover 88 and then act through rod 81 to pull the valve control member 61 into contact with member 75 and then through said member to operate the piston means 30 and rod 20 to draw the lever 23 back to its intermediate position, indicated by the dot and dash line 105, in which position the collar 86 on the operating rod 81 will engage the piston 80 which is in contact with the casing wall 4, whereby movement of the lever 23 past said intermediate position will be prevented. If at the time the pressure of fluid in the control pipe 7 is lost, the engine is operating at a speed less than the chosen speed above mentioned, then movement of the piston 80 into contact with wall 4 will act through the collar 86 and rod 81 to move the valve control member 61 into contact with surface 66a on the piston means 30 and then actuate said piston means and rod 20 to move lever 23 to its intermediate position for accelerating the engine, and at the same time the diaphragm 5 will deflect to the position determined by substantial contact between follower 99 and shoulder 37, and in which position the piston 89 will be in contact with the cover 88 to prevent movement of lever 23 past intermediate position.

It will thus be apparent that regardless of the position of lever 23, or regardless of the speed of the engine at the time of loss of fluid under pressure from pipe 7, the motor shown in Fig. 2 will operate automatically to move the lever 23 to its intermediate position and to then securely hold it against movement out of said position, to thereby insure that the engine will continue to operate as intended.

*Summary*

From the above description it will now be apparent that we have provided an improved fluid motor of the type embodying a fluid pressure actuated power portion and a fluid pressure controlled-pilot portion which may be relatively small, compact, light in weight, sensitive to variations in control pressure, positive and accurate in adjustment according to changes in the control pressure, and which is automatically operative in case of failure of the supply of controlling fluid pressure to move the device being controlled to a preselected position.

Having now described our invention, what we claim as new and desire to secure by Letters Patent is:

1. A fluid motor comprising a casing having a control chamber and a power chamber, regulating spring means in said casing, pilot piston means in said casing subject to opposing pressures of said regulating spring means and of fluid in said control chamber, valve means in said casing for controlling pressure of fluid in said power chamber, said pilot piston means being movable against said spring means upon an increase in pressure of fluid in said control chamber to effect operation of said valve means to supply fluid under pressure to said power chamber and being movable by said spring means upon a reduction in pressure of fluid in said control chamber to effect operation of said valve means to release fluid under pressure from said power chamber, power piston means in said casing subject to pressure of fluid in said power chamber and adjustable to one position when pressure in said power chamber is of one degree and adjustable to another position when the pressure in said power chamber is of greater degree, means operable by said spring means upon loss of fluid under pressure in said control chamber to move said power piston means, and means operable to limit movement of said power piston means by said regulating spring means to a position intermediate said one and another positions.

2. A fluid motor comprising a casing having a fluid pressure control chamber and a fluid pressure power chamber, power piston means in said casing subject to and adjustable by pressure of fluid in said power chamber, valve means in said casing operable to supply fluid under pressure to said power chamber, regulating spring means in said casing, pilot piston means in said casing subject to pressure of said regulating spring means and opposing pressure of fluid in said control chamber, other piston means in said casing operable by pressure of fluid in said control chamber to condition said regulating spring means for controlling said pilot piston means, said pilot piston means being movable, with said regulating spring means conditioned to control said pilot piston means, relative to said power piston means upon an increase in pressure in said control chamber to effect operation of said valve means to supply fluid under pressure to said power chamber to cause movement of said power piston means in a direction away from a normal position, and being movable relative to said power piston means upon a reduction in pressure in said control chamber to effect operation of said valve means to release fluid under pressure from said power chamber to cause movement of said power piston means in the opposite direction, and means associated with said pilot piston means and with the said other piston means operable by said regulating spring means upon loss of fluid under pressure from said control chamber to move said power piston means to and to hold same in a position out of said normal position.

3. A fluid motor comprising a casing, a lever having a fulcrum connection with said casing, and having a certain range of movement, regulating spring means in said casing, piston means in said casing arranged to control said movement of said lever and controlled by said spring means and opposing pressure of fluid in a control chamber and operable upon an increase in such pressure to effect movement of said lever in one direction and operable by said spring means upon a reduction in pressure of fluid in said chamber to effect movement of said lever in the opposite direction, piston means in said casing subject to and operable by pressure of fluid in said control chamber to render said regulating spring means effective to control positioning of said lever by operation of the first named piston means, said regulating spring means being operable upon loss of fluid under pressure on the second named piston means to effect movement thereof to a certain position, and means operable by said second named piston means upon movement to said certain position to move said lever to an intermediate position within its range.

4. A fluid motor comprising a casing having a power chamber and a control chamber, power piston means in said casing subject to and adjustable in accordance with pressure of fluid in said power chamber, pilot piston means in said casing arranged in coaxial relation with said power piston means and subject to and adjustable in accordance with pressure of fluid in said control chamber, valve means in said casing operable to supply fluid under pressure to said power chamber, a member arranged in coaxial relation with said power piston means and cooperable therewith upon axial movement to effect operation of said valve means, means separate from said pilot piston means carrying said member and valve means, and means connecting said member to said pilot piston means and operable upon axial movement of said pilot piston means to effect movement of said member, said means providing for movement of said pilot piston means relative to said member in a direction to rock the axis of said pilot piston means.

5. A fluid motor comprising a casing having a power chamber and a control chamber, power piston means in said casing subject to and adjustable in accordance with pressure of fluid in said power chamber, said casing having a wall forming one end of said power chamber, pilot piston means in said casing arranged in coaxial relation to said power piston means and controlled by pressure of fluid in said control chamber, regulating spring means arranged in coaxial relation with said pilot piston means and acting thereon in opposition to pressure of fluid in said control chamber, valve means for controlling supply and release of fluid under pressure to and from said power chamber, a member arranged in coaxial relation with said pilot piston means and cooperable with said power piston means upon movement of said member in one direction to effect operation of said valve means to supply fluid under pressure to said power chamber and upon movement of said member in the opposite direction to effect operation of said valve means to effect a release of fluid under pressure from said power chamber, said wall wholly carrying said valve means and member, means connecting said pilot piston means to said member, said pilot piston means being operable upon an increase in pressure in said control chamber to actuate said means to move said member in the said one direction, and said regulating spring means being operable upon release of fluid under pressure from said control chamber to effect movement of said member in the opposite direction.

6. A fluid motor comprising a casing having a power chamber and a control chamber, power piston means in said casing subject to and adjustable in accordance with pressure of fluid in said power chamber, said casing having a wall forming one end of said power chamber, pilot piston means in said casing arranged in coaxial relation to said power piston means and controlled by pressure of fluid in said control chamber, regulating spring means arranged in coaxial relation with said pilot piston means and acting thereon in opposition to pressure of fluid in said control chamber, valve means for controlling supply and release of fluid under pressure to and from said power chamber, a member arranged in coaxial relation with said pilot piston means and cooperable with said power piston means upon movement of said member in one direction to effect operation of said valve means to supply fluid under pressure to said power chamber and upon movement of said member in the opposite direction to effect operation of said valve means to effect a release of fluid under pressure from said power chamber, said wall carrying said valve means and member, means connecting said pilot piston means to said member, said pilot piston means being operable upon an increase in pressure in said control chamber to actuate said means to move said member in the said one direction, and said regulated spring means being operable upon release of fluid under pressure from said control chamber to effect movement of said member in the opposite direction, said means being so constructed as to render said pilot piston means tiltable relative to said member in directions to rock the axis of said pilot piston means.

7. A fluid motor comprising a casing having a power chamber, a control chamber, a dash-pot chamber and a constantly open communication between said control and said dash-pot chambers, choke means in said communication adapted to restrict flow of fluid under pressure into and out of said dash-pot chamber, a combined control and fluid pressure supply pipe connected to said control chamber and normally charged with fluid at a pressure in excess of atmospheric pressure, differential area piston means in said casing having at one side a relatively large area subject to pressure of fluid in said power chamber and having at the opposite side a smaller area subject to pressure of fluid in said dash-pot chamber, pilot piston means in said casing subject to pressure of fluid in said control chamber, regulating spring means in said casing opposing pressure of fluid on said pilot piston means, valve means in said casing for controlling pressure of fluid in said power chamber, said pilot piston means being movable against said spring means upon an increase in pressure of fluid in said control chamber to a position corresponding to the degree of such increase and being operable upon such movement to effect operation of said valve means to supply fluid under pressure from said pipe to said power chamber, said pilot piston means being movable by said spring means upon a reduction in pressure of fluid in said control chamber to a position corresponding to the degree of such reduction and being operable upon such movement to effect operation of said valve means to release fluid under pressure from said power chamber, said power piston means being movable relative to said pilot piston means upon an increase in pressure in said power chamber and upon a reduction in pressure in said power chamber to effect operation of said valve means to bottle the fluid pressure in said power chamber in a position of said power piston means corresponding to the position of said pilot piston means, said power piston means having a normal position corresponding to the position of said pilot piston means assumed with said pipe charged with fluid at the normal pressure and having another position corresponding to the position of said pilot piston means when subject to a maximum pressure of fluid in said pipe, and spring control means operable by pressure of fluid in said pipe to condition said regulating spring means for controlling the operation of said pilot piston means to effect corresponding positioning of the power piston means, said spring means being operable automatically upon loss of fluid under pressure from said pipe to effect operation of said spring control means and of said pilot piston means to effect movement of said power means to and then hold same in a position intermediate said normal and other position.

JOHN W. RUSH.
ARTHUR J. BENT.